Figure 1:
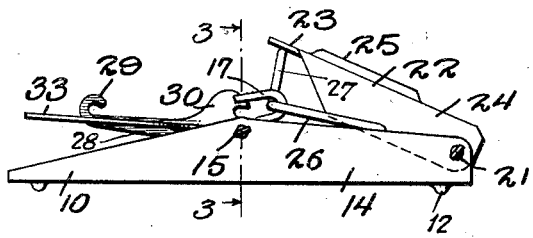

Jan. 24, 1928.

E. M. WANGER

ANIMAL TRAP

Filed Jan. 19, 1926

1,656,926

Edward M. Wanger, Inventor

Witnesses

By Richard B. Owen

Attorney

Patented Jan. 24, 1928.

1,656,926

UNITED STATES PATENT OFFICE.

EDWARD M. WANGER, OF WATKINS, MINNESOTA.

ANIMAL TRAP.

Application filed January 19, 1926. Serial No. 82,338.

This invention relates to improvements in animal traps and has for its prime object to provide a trap of the spring operated jaw type embodying novel jaw setting means.

A further object of the invention is the provision of a trap of the class stated embodying new and improved releasing mechanism.

Another object of the invention is the provision of an animal trap of the above type which can be readily set for operation and securely locked against accidental closing.

Another object of the invention is the provision of a trap of a compact and durable nature designed to operate in an efficient manner and which may be manufactured at a relatively low cost.

Other objects and advantages of the invention will become apparent as the description progresses.

Figure 2:
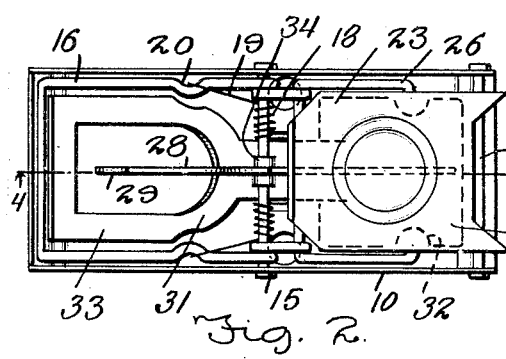
Figure 3:
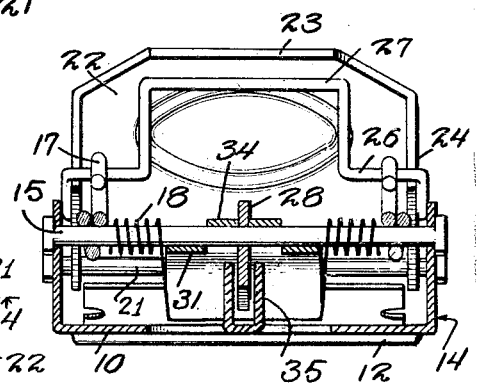
Figure 4:
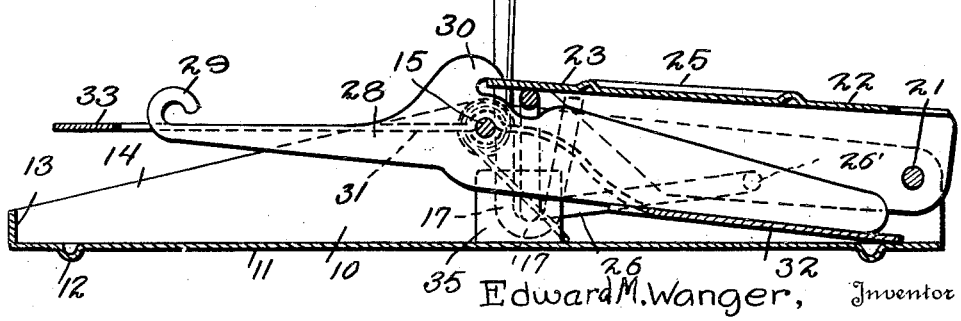

In the accompanying drawing forming a part of this specification and in which like reference characters are employed to designate corresponding parts throughout the same:

Figure 1 is a side elevational view of my improved trap, the parts being in closed or trapping position, Figure 2 is a top plan view of the same, Figure 3 is an enlarged transverse sectional view taken on the line 3—3 of Figure 1, and Figure 4 is a longitudinal sectional view taken on the line 4—4 of Figure 2, showing the trap in open position.

Referring to the drawing, wherein for the purpose of illustration is shown the preferred embodiment of my invention, the numeral 10 generally indicates the body of the trap comprising a base plate 11 of generally rectangular formation provided adjacent its ends with transverse downwardly projecting ridges 12. The forward end of the base plate is turned upwardly to provide a flange 13 while longitudinal tapered side plates 14 are formed at the longitudinal edges of the base plate. This supporting frame may be readily constructed of a single sheet of metal of durable construction and formed of various sizes to accommodate the mechanism for trapping various animals.

Positioned in oppositely disposed openings formed in the center of the side plates 14 adjacent the upper edge is a pivot bar 15 preferably of circular cross section and headed at its ends to provide against longitudinal displacement. This bar is adapted primarily to support a movable jaw 16 and operating mechanism therefor.

The jaw 16, in the present instance, is formed from a strand bent to wire of U-shaped formation, the side members of the jaw being looped, near their inner ends, about the pivot bar 15 adjacent the ends of said bar. The ends of the side members, beyond the loops, are bent to form U-shaped hooks 17. The jaw 16 is normally urged to a lowered position in contact with the base plate 11 through the medium of a resilient coiled spring 18, disposed upon the side portions of the pivot bar 15 and formed so that the ends 19 extend radially from the bar and engage inwardly projecting offsets 20 formed on the side members of the jaw. The central portion of the spring 18 is of U-shaped formation and projects downwardly in contact with the central portion of the base plate and is securely held against displacement by guide members, as will become apparent as the description progresses.

Pivotally mounted on a transverse rod 21 extending through openings formed adjacent the rear ends of the side plates 14 is a setting member 22 embodying a top plate 23 and longitudinal side plates 24. The side plates 24 are cut away at the forward portions as illustrated to advantage in Figures 1 and 4 of the drawing, and extend parallel to each other. This construction will permit the setting member 22 to be readily swung in a vertical arc above the rear portion of the base plate, and the plate 23 is preferably provided with an annular raised ridge 25 to provide a non-slipping surface.

Connected with the setting member 22 and adapted to oscillate forwardly thereof is a U-shaped wire bail 26, the end portions being provided with inwardly directed transverse projections 26′ for engagement in openings formed in the intermediate portions of the side plates 24 adjacent the rear ends thereof. The central portion of the transverse extension of the bail 26 is offset in a plane at an angle to the side members of the bail so as to normally contact with the forward portion of the top plate 23 of the setting member. The forward end portions of the side members of the bail are arranged to engage in the U-shaped hooks 17 of the jaw. This engagement will retain the jaw in open position, as will be presently explained. The structure is arranged to cause the side arms of the bail 26 to assume a downwardly inclined position, as shown to advantage in Figure 4, in the set position of the jaw, thus locking the jaw firmly in a vertical position. From the foregoing description it will be noted that the inner ends of the bail side arms engage the inner ends of the jaw hooks 17. When the plate 23 is forced downwardly it will contact with the intermediate offset portion of the bail and force the hooked ends of the jaw to swing downwardly by reason of the engagement of the bail side arms with the jaw hooks.

In order to provide releasing means of durable construction and delicate operation, I provide two independently operable mechanisms to trip the jaw. This is accomplished, in one instance, by the provision of a trigger lever 28 having the end portions tapering as shown to advantage in Figure 4, while the central portion is provided with an opening for pivotal engagement with the bar 15. The forward extremity of the lever 28 is curved to provide bait hook 29 arranged to retain suitable bait as an animal lure. Formed on the intermediate portion of the lever forwardly of the pivot connection is a rearwardly projecting nose 30 arranged to overhang the forward edge of the plate 23 of the setting member in the open or set position of the trap. An auxiliary releasing mechanism is also provided, embodying a frame 31 formed to provide a rectangular plate 32 at its rear portion and a similar forward plate 33, the frame being formed with a slot on its longitudinal center to permit unrestricted movement of the trigger lever 28. With particular reference to Figure 4, it will be noted that the rear plate 32 of the trip frame will engage the lower edge of the lever 28 so that downward movement of the forward trip plate will cause corresponding upward movement of the rear end of the lever. The intermediate portion of the trip frame is formed to provide bearing sleeves 34 engageable with the transverse bar 15 so that the trip frame is fulcrumed thereon. The lever 28 is retained in its central longitudinal position by a pair of guide wings 35, struck from the central portion of the base plate 11 and arranged at each side of the lever to prevent lateral movement thereof. Thus, it will be readily noted, that the trigger lever 28 is independently movable about the pivot bar, while the trip frame will necessarily actuate the trip lever upon operative movement thereof. It is therefore evident, from the foregoing construction, that efficient releasing mechanism has been devised assuring springing of the trap when an animal attacks the bait.

In operation, the trap is very conveniently set by merely pressing downwardly on the top plate of the setting member 22. This may be readily accomplished on the smaller types of traps by placing the finger in the central portion of the plate surrounded by the ridge 25. This downward movement of the operating frame will cause the bail 26 to be swung to a downward position so that the forward portion of the bail will engage the U-shaped hooks 17 of the jaw and swing the jaw to an upright vertical position. The angular connection of the bail arms and the jaw hooks will firmly retain the jaw in set position so that the trap will not be readily sprung by slight vibratory movement or accidental displacement of the trigger nose. The trigger 30 formed on the lever 28 is merely an auxiliary detent member, and is not positively essential to the operation of the trap. The nose is provided primarily to facilitate the setting of the trap and obviate the danger of injury during this operation. After the trap has been properly set and suitable bait secured upon the hook 29, the trap is placed in a desirable location. When an animal attacks the bait, the release of the jaw is assured by the provision of the dual releasing mechanism. If the bait is forced downwardly the rear end of the trip lever will engage the underside of the member 22 and cause this member to be swung upwardly, thus actuating the bail 26 and releasing the jaw. It will be noted, that this swinging movement of the lever 28 will disengage the trigger nose 30 from the plate 23 of the member 22 and permit unrestricted movement of the member 23 and actuation of the jaw 16 by the spring 18. If, on the other hand, the animal attempts to pull upwardly on the bait, the weight of its body on the forward extension of the trip frame 31 will swing this member downwardly, so that the rear portion of the trip frame and lever will be swung upwardly to release the member 22. This will result in actuation of the jaw.

Attention is invited to the fact that an important feature of the present trap structure is the angular connection of the jaw hooks and bail arms which will provide a secure jaw retaining structure. This structure, is however, readily releasable by a dual trip mechanism, operable by direct action on the bait hook or by pressure upon the frame structure disposed about the trigger lever. It is thought to be clearly evident, that the fundamental theory of operation is designed to provide a toggle effect whereby swinging movement of the operating frame 22 will control the position of the trap jaw and present a trap construction which may be conveniently set and efficiently operated.

It is to be understood that the form of my invention herewith shown and described is to be taken as the preferred example of the same, and that various changes as to the shape, size and arrangement of parts may be resorted to without departing from the spirit of the invention or the scope of the subjoined claims.

Having thus described my invention, I claim:

1. In a trap, a supporting frame, a pivotally supported jaw having extension hooks, a spring arranged to actuate the jaw from a set to a trapping position, means for setting the jaw embodying a toggle mechanism operatively connected with the jaw hooks and including a member manually operable to set or release the toggle mechanism, and trip means engagable with the member to release the jaw.

2. In a trap, a pivotally supported jaw, means acting to urge the jaw to trapping position, setting means operatively connected with the jaw and arranged to form a toggle and including a pivoted member operable to set or break the toggle mechanism, and trip means pivotally mounted and engageable with the said member to actuate the member and release the jaw.

3. In a trap including a movable jaw, and means urging the jaw to a trapping position; setting means including a pivoted member, a bail pivotally associated with the member and engageable with the jaw, the pivoted member being operable to set the jaw, and trip mechanism engageable with the movable member to release the jaw.

4. In a trap, a supporting frame, a jaw pivotally mounted on the intermediate portion of the frame, extension hooks formed on the jaw, means for urging the jaw to a closed position, a member pivotally connected with one end of the frame and opposing movement of the jaw, a bail pivotally connected with the intermediate portion of the said member and engageable with the jaw hooks, to set the jaw upon downward movement of the said member and release the same upon upward movement of the member, trip mechanism fulcrumed in the frame and arranged to actuate the said member to release the jaw and an auxiliary trip mechanism fulcrumed in the frame extending about the first mentioned trip mechanism.

5. In a trap, a supporting frame, a jaw pivotally mounted at the intermediate portion of the frame, spring means urging the jaw to a downward closed position, setting mechanism arranged to form a toggle operatively connected to the jaw extensions and embodying a pivotally mounted member, the said member being arranged to be swung downwardly to set the jaw and to be actuated to break the toggle and release the jaw, and trip means pivotally mounted in the supporting frame and having a forwardly projecting portion adapted to be actuated by an animal, and a rearwardly projecting portion engageable with the said member, whereby movement of the trip means will actuate the said member and toggle and release the jaw.

6. In a trap, a supporting frame, a pivotally supported jaw mounted at the intermediate portion of the frame, hooked extensions formed on the jaw, means urging the jaw to a closed position, setting mechanism including a member pivotally mounted on the supporting frame, a bail pivotally connected with the said member and projecting forwardly in engagement with the jaw extensions, the said member being movable to actuate the toggle and set the jaw and operable to break the toggle to release the jaw, and releasing mechanism including a fulcrumed trigger lever having a bait hook on one end and an extension on the opposite end engageable with the said member, and a fulcrumed trip member movable to provide an auxiliary actuating means to release the jaw.

In testimony whereof I affix my signature.

EDWARD M. WANGER.